United States Patent
Mukai et al.

(10) Patent No.: US 11,376,547 B2
(45) Date of Patent: Jul. 5, 2022

(54) SPIRAL WOUND MEMBRANE MODULE FOR GAS SEPARATION WITH PROTECTION LAYER

(71) Applicants: Fujifilm Manufacturing Europe B.V., Tilburg (NL); Fujifilm Corporation, Tokyo (JP)

(72) Inventors: Atsushi Mukai, Tilburg (NL); Anton Van Der Pluijm, Tilburg (NL); Nori Miyagishima, Tilburg (NL); Kazuomi Inoue, Tilburg (NL); Davide Bocciardo, Tilburg (NL); Yujiro Itami, Tilburg (NL)

(73) Assignees: Fujifilm Manufacturing Europe B.V., Tilburg (NL); Fujifilm Corporation, Tokyo (JP)

(*) Notice: Subject to any disclaimer, the term of this patent is extended or adjusted under 35 U.S.C. 154(b) by 226 days.

(21) Appl. No.: 16/633,331

(22) PCT Filed: Jul. 5, 2018

(86) PCT No.: PCT/GB2018/051910
§ 371 (c)(1),
(2) Date: Jan. 23, 2020

(87) PCT Pub. No.: WO2019/020970
PCT Pub. Date: Jan. 31, 2019

(65) Prior Publication Data
US 2020/0156000 A1   May 21, 2020

(30) Foreign Application Priority Data
Jul. 24, 2017 (GB) .................... 1711882

(51) Int. Cl.
*B01D 53/22* (2006.01)
*B01D 69/10* (2006.01)
(Continued)

(52) U.S. Cl.
CPC .......... *B01D 53/228* (2013.01); *B01D 69/10* (2013.01); *B01D 63/10* (2013.01); *B01D 69/12* (2013.01);
(Continued)

(58) Field of Classification Search
None
See application file for complete search history.

(56) References Cited

U.S. PATENT DOCUMENTS

| | | |
|---|---|---|
| RE30,351 E | 7/1980 | Hoehn et al. |
| 6,277,282 B1 | 8/2001 | Kihara et al. |

(Continued)

FOREIGN PATENT DOCUMENTS

| | | |
|---|---|---|
| EP | 1029583 A1 | 8/2000 |
| EP | 1059114 A2 | 12/2000 |

(Continued)

*Primary Examiner* — Jason M Greene
(74) *Attorney, Agent, or Firm* — Banner & Witcoff, Ltd.

(57) ABSTRACT

A process for separating a feed gas comprising a polar gas and a non-polar gas into a permeate gas and a retentate gas, one of which is enriched in the polar gas and the other of which is depleted in the polar gas, the process comprising passing the feed gas through a gas separation module comprising: (i) a feed carrier comprising a membrane envelope and a feed spacer located within the membrane envelope; and (ii) a permeate carrier comprising: (a) a macroporous sheet; and (b) a protective sheet; and wherein: i) the feed gas is fed along the feed spacer of the feed carrier and a part of the feed gas passes through the membrane envelope and into the permeate carrier to give the permeate gas and a part of the feed gas is rejected by the membrane to give the retentate gas; ii) the protective sheet shields at least a part of the membrane envelope from contact with the macroporous sheet; and iii) the protective sheet comprises a non-woven material.

20 Claims, 4 Drawing Sheets

(51) Int. Cl.
*B01D 63/10* (2006.01)
*B01D 69/12* (2006.01)
*B01D 71/64* (2006.01)

(52) U.S. Cl.
CPC ........ *B01D 71/64* (2013.01); *B01D 2257/304* (2013.01); *B01D 2257/504* (2013.01); *B01D 2258/0283* (2013.01)

(56) References Cited

U.S. PATENT DOCUMENTS

| | | | |
|---|---|---|---|
| 6,454,942 B1 | 9/2002 | Shintani et al. | |
| 6,656,362 B1 | 12/2003 | Kihara et al. | |
| 2013/0098831 A1* | 4/2013 | Shrikhande | B01D 63/10 210/488 |
| 2014/0263025 A1* | 9/2014 | Maxwell | B01D 63/103 210/321.74 |
| 2016/0256828 A1* | 9/2016 | Van Der Burg | B01D 53/22 |
| 2016/0256829 A1* | 9/2016 | Jessen | B01D 53/228 |
| 2016/0256830 A1 | 9/2016 | Toet et al. | |

FOREIGN PATENT DOCUMENTS

| | | | | |
|---|---|---|---|---|
| JP | 10-5554 | * | 1/1998 | ............. B01D 63/10 |
| JP | H105554 A | | 1/1998 | |
| WO | 2015107776 A1 | | 7/2015 | |

\* cited by examiner

Fig. 1

CONVENTIONAL

Fig 2

CONVENTIONAL

SPIRAL WOUND MEMBRANE MODULE FOR GAS SEPARATION WITH PROTECTION LAYER

RELATED APPLICATIONS

This application is a National Stage Application under 35 U.S.C. 371 of co-pending PCT application PCT/GB2018/051910 designating the United States and filed Jul. 5, 2018; which claims the benefit of GB application number 1711882.9 and filed Jul. 24, 2017 each of which are hereby incorporated by reference in their entireties.

This invention relates to a process for separating polar and non-polar gases, to gas separation elements, to gas separation modules and to their uses.

Gas separation modules typically comprise one or more gas separation elements, wherein each element comprises a feed carrier and a permeate carrier. The feed carrier typically comprises a feed spacer sandwiched between membrane sheets. The permeate carrier typically comprises one or more macroporous sheets and optionally a gas-impermeable sheet. The contact area of the macroporous sheet of the permeate carrier and the feed spacer of the feed carrier with the membrane sheets is very high (in many cases approaching 100%). The membrane sheets typically comprise a polymeric discriminating layer and a porous support.

Typically a stack of gas separation elements comprising alternating feed carriers and permeate carriers are wound spirally onto a perforated permeate collection tube which collects gas which has permeated through the membrane and into the macroporous sheet of the permeate carrier. In spiral-wound gas separation modules, the outside edges of the gas separation elements are generally sealed on all but one side, allowing access to the permeate carrier only from a radial direction through the membrane. The gas separation elements are placed with the unsealed edge adjacent to a perforated permeate collection tube and oriented along the length of the tube, allowing the permeate to flow into the permeate collection tube.

After the gas separation elements are wound onto a permeate collection tube, some type of external restraining means such as a hard shell, straps, anti-telescoping device or a bypass screen, or a combination thereof may be used to hold the spiral wound gas separation elements in tight formation around the tube. The spiral module is then loaded into a pipe-like housing or pressure vessel which is operated at a slight pressure drop across the module as the gas being filtered flows through.

One of the problems faced by gas separation elements and modules currently available is that when they are used to separate 'dirty' mixtures of polar and non-polar gases, i.e. polar/non-polar gas mixtures contaminated with unwanted hydrocarbons, their selectivity drops significantly over time. There is a need for gas separation elements and modules whose selectivity is maintained, or declines only slowly, when exposed to such 'dirty' gas mixtures.

According to a first aspect of the present invention there is provided a process for separating a feed gas comprising a polar gas and a non-polar gas into a permeate gas and a retentate gas, one of which is enriched in the polar gas and the other of which is depleted in the polar gas, the process comprising passing the feed gas through a gas separation module comprising:
  (i) a feed carrier comprising a membrane envelope (7) and a feed spacer (19a) located within the membrane envelope (7); and
  (ii) a permeate carrier comprising:
    (a) a macroporous sheet (19b); and
    (b) a protective sheet (24); and
  wherein:
  i) the feed gas is fed along the feed spacer of the feed carrier and a part of the feed gas passes through the membrane envelope and into the permeate carrier to give the permeate gas and a part of the feed gas is rejected by the membrane to give the retentate gas;
  ii) protective sheet (24) shields at least a part of the membrane envelope (7) from contact with the macroporous sheet (19b); and
  iii) protective sheet (24) comprises a non-woven material.

The term "comprising" is to be interpreted as specifying the presence of the stated parts, steps or components, but does not exclude the presence of one or more additional parts, steps or components.

Reference to an item by the indefinite article "a" or "an" does not exclude the possibility that more than one of the item(s) is present, unless the context clearly requires that there be one and only one of the items. The indefinite article "a" or "an" thus usually means "at least one".

The protective sheet (24) typically comprises fibres, many, most or all of which orientated randomly. Non-woven materials comprising randomly orientated fibres are abbreviated herein as "anisotropic materials". Thus anisotropic materials lack the highly ordered arrangement of fibres seen in woven materials.

Preferred protective sheets (24) have a density of at least 0.7 g/cm$^3$, more preferably at least 0.9 g/cm$^3$. In a preferred embodiment the protective sheet (24) has a density in the range 0.7 g/cm$^3$ to 1.2 g/cm$^3$, more preferably 0.9 g/cm$^3$ to 1.1 g/cm$^3$.

The protective sheet (24) preferably consist of or consists essentially of randomly orientated fibres.

The protective sheet (24) preferably comprises polyester fibres, especially randomly orientated polyester fibres.

The protective sheet (24) preferably has a weight of at least 35 g/m$^2$, more preferably above 50 g/m$^2$, especially 60 to 120 g/m$^2$, e.g. 110 g/m$^2$.

The protective sheet (24) is preferably a drylaid or wetlaid non-woven material, preferably a wetlaid non-woven material. Typically drylaid non-woven materials are manufactured by forming fibres into a webbed shape by using a machine called a "card" and binding fibres by punching them with a needle called a "needle punch" or melting them by heat. Such protective sheets are often characterized by a cloth-like texture and are often used for clothing and sanitary products. Typically the manufacturing method for wetlaid non-woven materials is the same as traditional paper-making: mixing water and fibres, straining them on a net and dehydrating by compression and heating. Drylaid and wetlaid non-woven materials are available commercially, e.g. preferred wetlaid non-woven materials are obtained from Hirose Paper Mfg Co., Ltd. in Japan. The 05TH high density wetlaid non-woven fibres from Hirose are particularly preferred due to their high strength and excellent dimensional, thermal and chemical stability. Examples of commercially available non-woven materials that may be used as the protective sheet include 05TH100, 05TH100S, 05TH20H, 05TH40H and 315TH80S, all from Hirose paper manufacturing.

In a preferred embodiment, the cross-sectional area of the protective sheet (24) is the same as or smaller than the cross-sectional area of the macroporous sheet (19b). When the macroporous sheet (19b) has one rough side and one smooth side one may locate the protective sheet (24)

between the rough side of the macroporous sheet (19b) and the membrane and the presence of a further protective sheet (24) between the smooth side of the macroporous sheet (19b) and the membrane is optional. However, when the macroporous sheet (19b) is rough on both sides the gas separation element preferably comprises a protective layer (24) on each side of the macroporous sheet (19b) and in contact with the wall of the membrane envelope (7).

In one embodiment, the cross-sectional area of the protective sheet (24) and the cross-sectional area of the permeate carrier are substantially identical, for example the length and width of the membrane envelope (7) and the permeate carrier are substantially identical. In another embodiment, the cross-sectional area of the membrane envelope (7) and the permeate carrier are not identical, for example the length and/or width of the permeate carrier is smaller than length and/or width of the membrane envelope.

Figure 1:
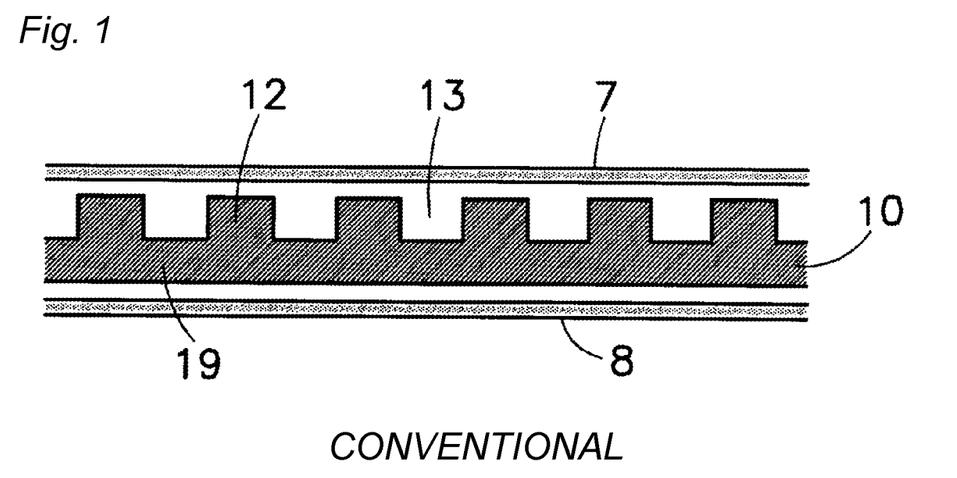
FIG. 1 is a schematic vertical sectional view showing part of a conventional gas separation element comprising outer gas separation membranes and an inner, profiled macroporous sheet.

In FIG. 1 there is shown part of a conventional gas separation element used in a conventional gas separation module. In FIG. 1, the conventional gas separation element (10) comprises a first gas separation membrane (7), a second gas separation membrane (8) and a macroporous sheet (19) provided between these gas separation membranes. The macroporous sheet (19) is made from a knitted single tricot fabric. The macroporous sheet (19) has projections (12) and depressions (grooves) (13) formed alternately at constant intervals on the upper surface. The grooves form main channels for flow of permeate gas.

Figure 2:
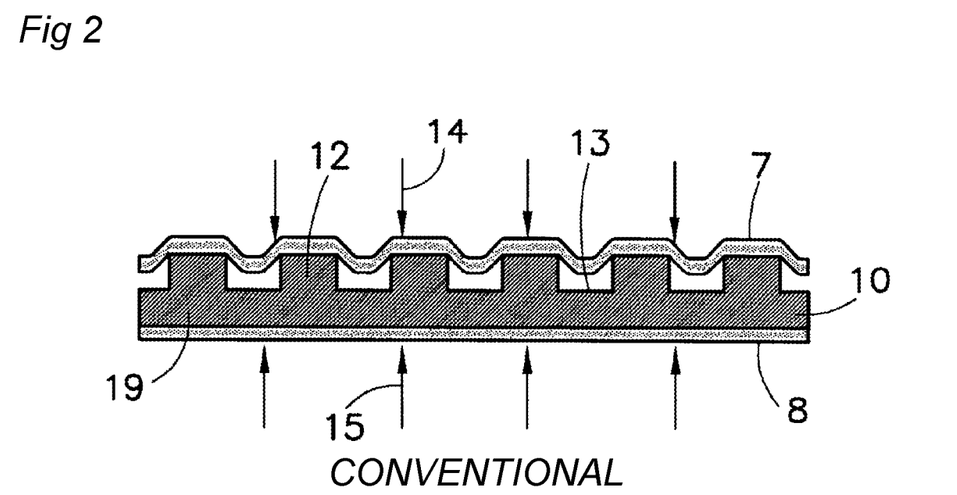
FIG. 2 is a schematic vertical sectional view showing the deformation of the membrane wall of the conventional gas separation membrane part of FIG. 1 caused at a high gas pressure

FIG. 2 is a schematic vertical sectional view showing the deformation of the gas separation membrane (10) caused at a high pressure in the conventional gas separation element shown in FIG. 1. In FIG. 2, the feed gas flows above the first gas separation membrane (7) and below the second gas separation membrane (8), and partially permeates the gas separation membranes (7) and (8) to reach the macroporous sheet (19). In this case, if the feed gas is supplied at a high pressure, the first gas separation membrane (7) located on the rough side of the macroporous sheet (19) is partially depressed into the grooves (13), and is deformed. The pressure acting on the first gas separation membrane (7) is indicated by arrows (14), and the pressure acting on the second gas separation membrane (8), by arrows (15). The deformation of the first gas separation membrane (7) partially closes the grooves (13) which are main pathway for the flow of gas which has permeated through the membrane (7). Furthermore, the deformation damages the first gas separation membrane (7), thereby lowering the performance of the gas separation membrane (7) such as lowering the membrane's separation selectivity.

Figure 3:
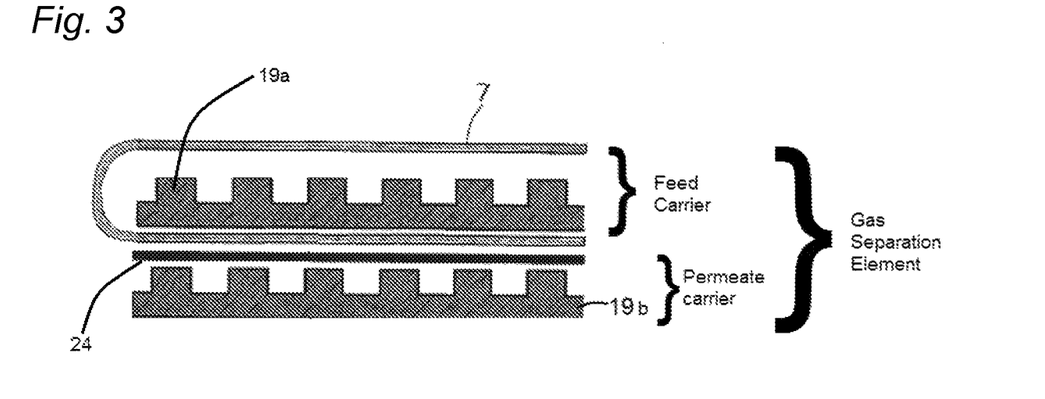
FIG. 3 is a schematic vertical sectional view showing an embodiment of a gas separation element of the present invention wherein the permeate carrier comprises one macroporous sheet (19b) and one protective sheet (24).

FIG. 3 is a schematic vertical sectional view showing an embodiment of the gas separation element according to the present invention. In FIG. 3, the feed carrier comprises a membrane envelope (7) and a feed spacer (19a) located within the membrane envelope (7). The permeate carrier consists of a protective sheet (24) and a macroporous sheet (19b) having projections and grooves. FIG. 3 illustrates the basic structure of the gas separation element of the present invention and more complex structures are possible, as described in FIG. 4 and FIG. 5 below. It is preferable that the macroporous sheet (19b) has grooves on at least one surface as shown in FIG. 3, and is made from a woven or knitted fabric.

Figure 4:
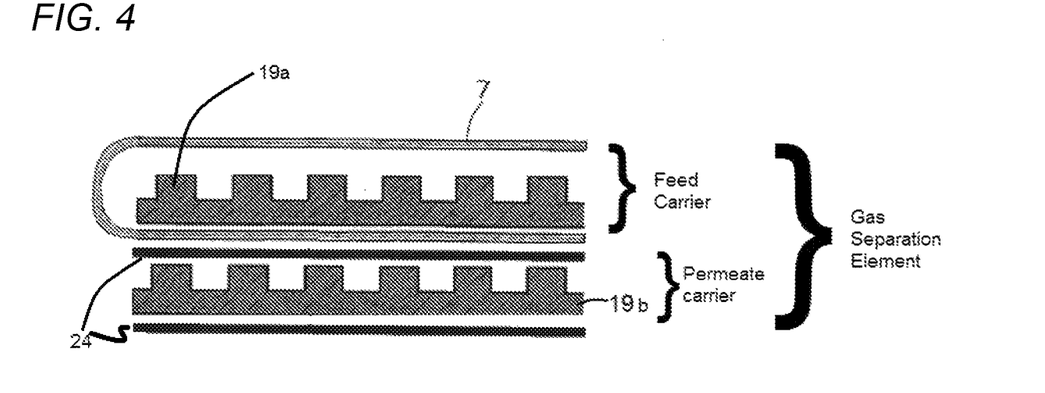
FIG. 4 is a schematic vertical sectional view showing an embodiment of a gas separation element of the present invention wherein the permeate carrier comprises one macroporous sheet (19b) and two protective sheets (24, 24).

FIG. 4 is the same as FIG. 3 except that the permeate carrier consists of two protective sheets (24, 24), and a macroporous sheet (19b) having projections and grooves.

Figure 5:
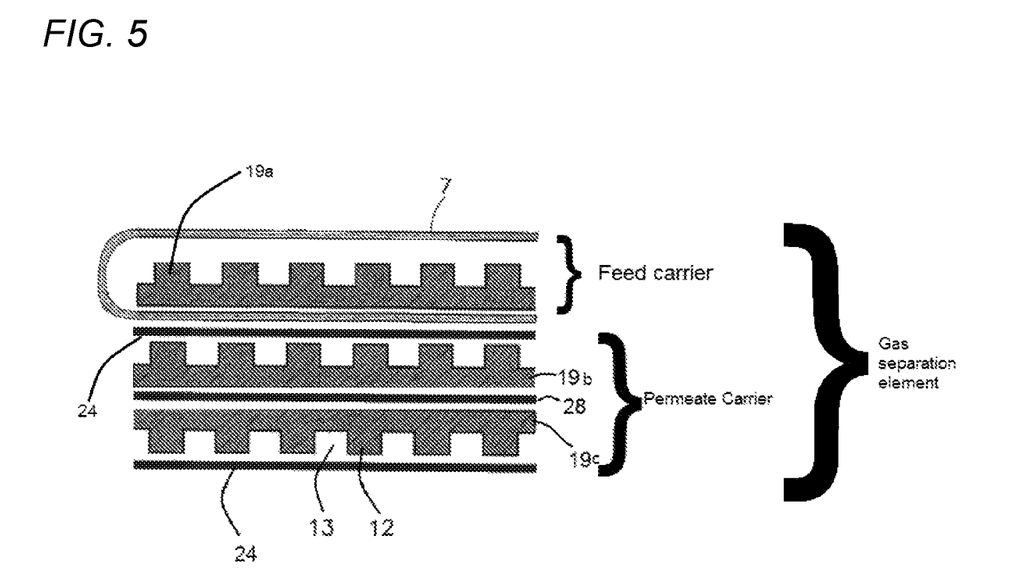
FIG. 5 is a schematic vertical sectional view showing an embodiment of a gas separation element of the present invention wherein the permeate carrier comprises two macroporous sheets (19b, 19c), two protective sheets (24, 24) and one gas-impermeable sheet (28) located between the two macroporous sheets (19b, 19c).

FIG. 5 is the same as FIG. 3 except that the permeate carrier comprises two macroporous sheets (19b, 19c), two protective sheets (24, 24), and a gas-impermeable sheet (28), wherein the gas-impermeable sheet (28) is sandwiched between the two macroporous sheets (19b, 19c), and the two macroporous sheets (19b, 19c) are sandwiched between the two protective sheets (24, 24).

Figure 6:
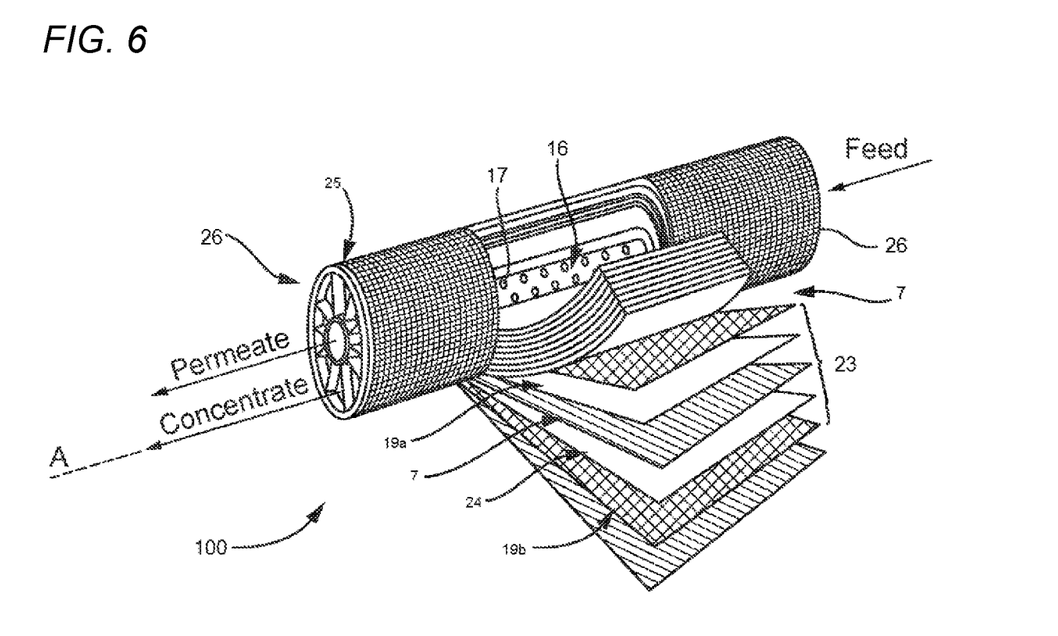
FIG. 6 is a partially exploded, perspective view of a gas separation module of the present invention.
Figure 7:
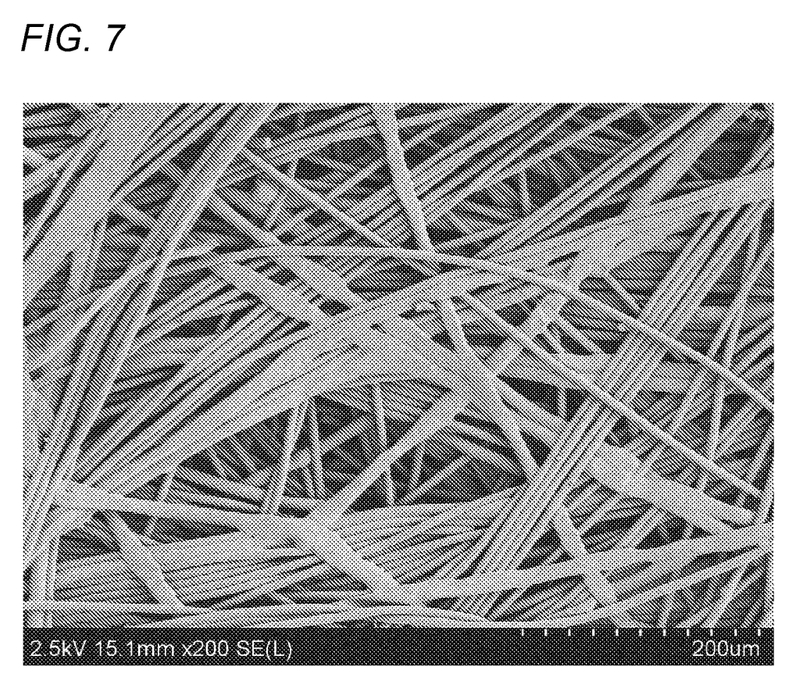
FIG. 7 is a non-woven protective sheet (24) comprising randomly orientated fibres (an anisotropic material).
Figure 8:
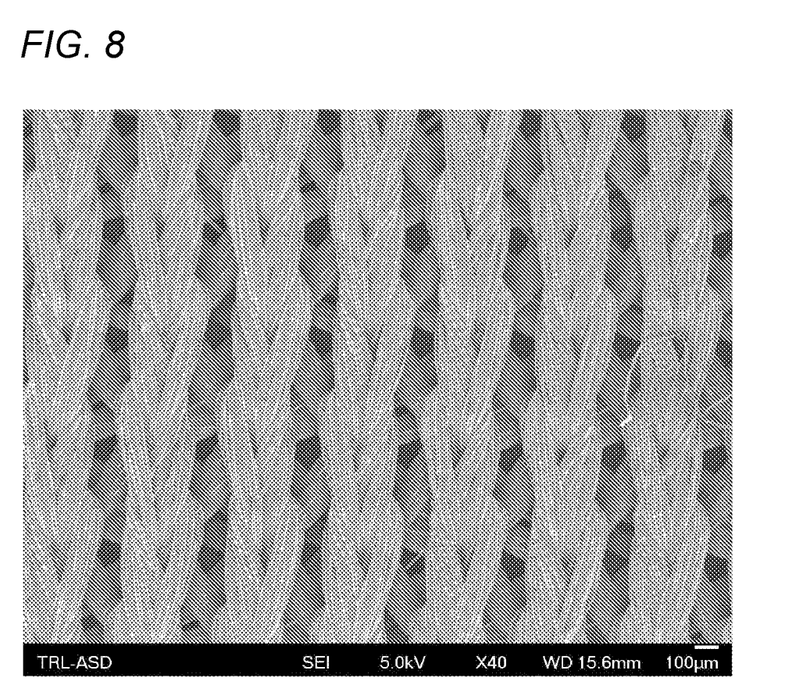
FIG. 8 is a macroporous sheet (19b) which may be used as a permeate carrier (i.e. not an anisotropic material).

Referring to FIG. 6, a gas separation module according to the present invention is designated generally by the numeral (100). The module (100) comprises a central permeate collection tube (16) having perforations (17) along its length. The module includes a gas separation element (23) wound around the permeate collection tube (16). The gas separation element (23) consists of a feed carrier and a permeate carrier. The feed carrier comprises a membrane envelope (7,7) and a feed spacer (19a) located within the membrane envelope (7,7). The permeate carrier comprises a protective sheet (24) and a macroporous sheet (19b). Thus the protective sheet (24) is in contact with the membrane envelope (7) and the macroporous sheet (19b) and the protective sheet (24) shields the membrane envelope (7) from contact with the macroporous sheet (19b). In one embodiment, a membrane sheet is folded around the feed spacer (19a) to form the membrane envelope (7) such that the two are substantially coextensive. Each gas separation element (23) is oriented to present the open edge generally adjacent the tube (16), a pair of side edges and an axial edge distal from the tube (16) and oriented to be in parallel with the axis of the tube (16). A liquid adhesive (not shown) is applied between the opposite side edges of the membrane envelope (7, 7) to create gas-tight edge seams. The fourth, distal and open edge of the gas separation element (23) is fixed onto the permeate collection tube (16) so that gas which has permeated into the permeate carrier can flow through perforations (17) and into the permeate collection tube (16). The edges between adjacent gas separation elements (23) which lie along the axial length of permeate collection tube (16) are sealed so that feed gas can flow through the feed spacer between the permeate carriers but cannot enter the permeate collection tube (16) without first passing through the membrane wall of the membrane envelope (7, 7) and into the permeate carrier.

The gas separation elements may thus be spirally wound around permeate collection tube (16) with the open end of the permeate carrier located adjacent to tube (16) and in gas communication therewith. Typically a plurality of gas separation elements are spirally wound about the permeate collection tube (16). The wound gas separation elements are held in place and prevented from unwinding using end caps (25). FIG. 6 also shows the direction in which feed gas enters the module (at (right-side-26)) and how the permeate exits the module via the tube (16) whereas the retentate exits the module through the open spokes of end cap (25). Preferably the protective sheet shields the membrane envelope (7) from all rough surfaces of the macroporous sheet (19b). Thus where the macroporous sheet (19b) has a rough surface and a smooth surface, preferably the protective sheet (24) shields the membrane envelope (7) from at least the rough surface of the macroporous sheet (19).

In a preferred embodiment there is no contact between the membrane envelope (7) and any rough surfaces of the macroporous sheet (19b), more preferably there is no contact a all between the membrane envelope (7) and the permeate carrier's macroporous sheet (19b). Optionally the membrane envelopes (7) are adhered to the edges of a macroporous sheet (19b) which encircles permeate collection tube (16) except for an open edge generally adjacent to the tube (16).

In one embodiment both faces of the membrane envelope (7) are shielded from macroporous sheets (19b) of adjacent permeate carriers by protective sheet(s) (24). One may shield both sides of the membrane envelope (7) from the macroporous sheet (19b) of adjacent permeate carriers in a number of ways. For example, one may include at least one protective sheet (24) on each side of the macroporous sheet (19b). Alternatively one may fold one or more protective sheets (24) around the macroporous sheet (19b) in order to provide a barrier between the macroporous sheet (19b) and the walls of membrane envelopes (7) located on each side of the permeate carrier.

Referring to FIG. 3, the optional grooves are not especially limited in width, depth or density. They are only required to provide low flow resistance for the permeated gas and to sufficiently support the protective sheet (24) at high gas pressures.

It is preferable that the width of the optional grooves of the macroporous sheet (19b) is in a range of 100 to 200 μm, more preferably 100 to 150 μm, to inhibit the depression of the membrane walls of the feed carrier into the grooves of the macroporous sheet (19b) at a high gas pressures.

Preferably the membrane envelope (7) is constructed from a membrane having a thickness of about 100 to 300 μm, e.g. 120 to 250 μm. If the width of the grooves of the macroporous sheet (19b) is as large as or smaller than the thickness of the membrane walls, the membrane walls of the feed carrier are not substantially depressed into the grooves of the macroporous sheet (19b).

Preferably the macroporous sheet (19b) comprises grooves having a width of 100 μm or more. If the width is less than 100 μm, the flow resistance to the permeated gas may become large.

Preferably the depth of the grooves of the macroporous sheet (19b) is 50 μm or more. If the depth is less than 50 μm, the pathway for the permeated gas may become small, and a slight deformation of the membrane walls of the membrane envelope (7) at high pressures is more likely thereby increasing flow resistance. Preferably the depth of the grooves is 200 μm or less. If the depth is more than 200 μm, the thickness required for the macroporous sheet (19b) becomes large, thereby reducing the packed membrane area of the gas separation element when the gas separation element is installed in a gas separation module.

In view of the foregoing it is preferable for the macroporous sheet (19b) to comprise grooves having a depth in the range of 50 to 200 μm (more preferably 80 to 150 μm) in order to lessen the flow resistance to the permeated gas. The flow resistance of the macroporous sheet (19b) depends to some extent on the density of any grooves present therein, i.e., the number of grooves per unit length. In the gas separation element of the present invention, it is preferable that the macroporous sheet (19b) comprises, on one side or on both sides, 45 to 70 grooves per 2.5 cm, more preferably 50 to 60 grooves per 2.5 cm.

If the density of the grooves is less than 45 grooves per 2.5 cm, the number channels for permeated gas becomes small, thereby increasing resistance to the permeate flow. If the density of the grooves is higher, the flow resistance can be desirably made smaller. However, if the density of the grooves exceeds 70 grooves per 2.5 cm, the width of the projections on the macroporous sheet (19b) for supporting the membrane wall of the membrane envelope (7) at a high pressure becomes small. As a result, the macroporous sheet (19b) itself may become deformed, and the depth of the grooves may also be reduced thereby increasing the flow resistance.

The type of woven or knitted fabric which may be used as the macroporous sheet (19b) is not especially limited. However, in order to produce high-quality elements and modules at low cost, the use of a knitted tricot fabric is preferable. Many types of knitted tricot fabrics are available, for example double denbigh and queens cord, but any knitting system can be adopted provided that the knitted fabric allows the permeated gas to flow freely through the permeate carrier without becoming deformed.

Materials which may be used for the macroporous sheet (19b) include, for example, polyamide fibres, polyester fibres, polyacrylonitrile fibres, polyolefin fibres, polyvinyl chloride fibres, polyvinylidene chloride fibres, polyfluoroethylene fibres, carbon fibres, etc. Polyester fibres are particularly preferred due to their strength, their ability to withstand a high pressure and the ease with which polyester fibres may be processed.

To prevent deformation of the macroporous sheet (19b) at high gas pressures, it is preferable to treat the woven or knitted fabric by using a hardening treatment, to raise its rigidity. The hardening treatment can be effected by, for example, impregnating the woven or knitted fabric with melamine or epoxy resin, or heating the woven or knitted fabric, to fuse and solidify the fibres together by heat fusion.

The protective sheet (24) preferably has a high density because this can help to prevent the membrane envelope (7) from being locally or unevenly deformed by contact with the macroporous sheet (19b). Optionally one may obtain a protective sheet (24) which has a lower density than that claimed and treat that sheet in order to increase its density into the claimed range, e.g. by performing a calendering process. In one embodiment the protective sheet (24) is a non-woven sheet which has been calendered on both sides. The calendering makes the fabric very smooth, flat and more rigid. In this way the protective sheet (24) reduces the likelihood of the walls of the membrane envelope (7) being deformed at a high gas pressures, thereby improving the performance and durability of the gas separation element.

Preferably the average surface roughness (Ra) of the protective sheet (24) is 20 μm or less, more preferably 15 μm or less. The average surface roughness (Ra) of the protective sheet (24) can be determined by obtaining a sectional curve showing the sectional form of the protective sheet (24), drawing a straight line parallel to the average line of the section and not intersecting the sectional curve, measuring the vertical distances from the straight line to the crests and troughs of the sectional curve, and obtaining the difference between the average distance of the highest to 5th crests and the average distance of the lowest to 5th troughs. It is preferable that the protective sheet (24) has an average surface roughness (Ra) of 2 μm or more.

To achieve the desirable average surface roughness (Ra), it is recommended to calender the fabric for making its surface smooth and rigid. If the surface of the fabric is made smooth and rigid, damage to the walls of membrane envelope (7) caused (indirectly) by the surface roughness of the macroporous sheet (19b) can be decreased, thereby improving the durability of the gas separation element.

When determining the calendering conditions for a particular fabric one will ensure that the physical properties of the fabric are taken into account, for example the melting point and elasticity of the fabric.

The gas permeability of the protective sheet (24) is preferably more than 0.5 cc/(cm$^2$*sec), e.g. 0.51 to 4.5 cc/(m$^2$*sec).

If the thickness of the protective sheet (24) is too small, the rigidity declines, and the walls of the membrane envelope (7) may be deformed at high gas pressures. If the thickness of the protective sheet (24) is too large, the working area of the gas separation membrane obtained when the gas separation element is installed in a gas separation module decreases disadvantageously although the rigidity is good. It is preferable that the average thickness of the protective sheet (24) is 50 to 200 μm, more preferably 70 to 150 μm.

Materials which can be used to make the protective sheet (24) include polyamide fibres, polyester fibres, polyacrylonitrile fibres, polyolefin fibres, polyvinyl chloride fibres, polyvinylidene chloride fibres and polyfluoroethylene fibres.

For the protective sheet (24), various structures with desired gas permeability, surface smoothness and rigidity can be used. Using a non-woven protective sheet (24) assists the achievement of the desired gas permeability, surface smoothness and rigidity and one may obtain the materials to make such a sheet from commercial sources. Surprisingly, as can be seen from comparing the selectivity results for Examples of the present invention with Comparative Example 6, use of a non-woven protective sheet (24) can also improve selectivity compared to when a woven protective sheet is used.

A non-woven fabric generally has a structure in which short fibres of several millimetres to several centimetres in length are entangled with each other randomly. By selecting the density of fibres and post-processing, various non-woven fabrics are produced ranging from a low permeability non-woven fabric with little clearance between fibres in a dense texture to a highly gas permeable non-woven fabric with many clearances between fibres. One will choose a non-woven fabric which has good gas permeability.

The fibres present in the protective layer (24) may be oriented at random, oriented substantially in a certain direction, or the fibres may be oriented somewhere between these two extremes. Furthermore, when the protective sheet (24) is a non-woven fabric comprising fibres oriented substantially in a certain direction, it is preferable that the direction of oriented fibres is substantially perpendicular to the direction of the direction of the grooves of the macroporous sheet (19b).

The walls of the membrane envelope (7) preferably comprise a composite membrane, e.g. comprising a porous support. The protective sheet (24) is provided to prevent the depression of the walls of the membrane envelope (7) into the grooves of the macroporous sheet (19b) which provide a pathway for permeate gas to flow through.

The macroporous sheet (19b) preferably comprises an orderly arrangement of fibres. i.e. the macroporous sheet (19b) is preferably not an anisotropic material (in other words the macroporous sheet (19b) is preferably a material other than an anisotropic material). One may ensure that the macroporous sheet (19b) comprises an orderly arrangement of fibres by selecting a manufacturing process for making the macroporous sheet (19b) which results in such an arrangement. Preferably all or substantially of the fibres present in the macroporous sheet (19b) are arranged in an orderly/regular manner.

Preferably the macroporous sheet (19b) has an average thickness of 150 to 800 μm, more preferably 200 to 500 μm and especially 250 to 400 μm.

In one embodiment (e.g. as illustrated in FIG. 5) the permeate carrier comprises two or more macroporous sheets (19b, 19c). For example, the permeate carrier comprises at least two macroporous sheets (19b, 19c) and a gas-impermeable sheet (28) located between the macroporous sheets (19b, 19c), preferably being coextensive therewith. In an alternative embodiment, the permeate carrier comprises one macroporous sheet (19b) folded around the gas-impermeable sheet. For example, the permeate carrier comprises one macroporous sheet (19b) and a gas-impermeable sheet (28) of half the cross-sectional area of the macroporous sheet (19b) and the macroporous sheet (19b) is folded around the gas-impermeable sheet (28), preferably such that the macroporous sheet (19b) and the gas-impermeable sheet are substantially coextensive.

The permeate carrier preferably comprises one or more macroporous sheets (19b) having pores of average size >30 μm.

The macroporous sheet(s) (19b) typically have a very high gas permeability. The macroporous sheet(s) (19b) are not included to discriminate between gases but instead to provide a pathway for the permeate gases to flow through. Suitable macroporous sheets (19b) include woven fabrics, especially knitted fabrics, more especially warp-knitted fabrics and weft-knitted fabrics. Knitted fabrics typically comprise a plurality of consecutive rows of loops, called stitches. As each row progresses, a new loop is pulled through an existing loop. The active stitches are held on a needle until another loop can be passed through them. This process eventually results in a knitted fabric. Knitting may be done by hand or more typically by machine. Suitable weft-knitted fabrics can be made from one yarn, although more than one yarn can be used to achieve particular patterns and surface profiles in the fabric and create a surface texture which gives rise to the desired contact area. The yarn is typically inserted in a horizontal or weft direction, hence the classification as weft-knitted.

Rows of stitches in knitted fabrics are called 'courses' and columns of stitches are called 'wales'.

Warp-knitted fabrics are also composed of loops arranged in wales and courses. The yarn is typically inserted in the vertical or warp direction, hence the classification as warp-knitted. They require at least one warp yarn to supply each needle on a knitting machine manufacturing the warp-knitted fabric. They are normally made with two or more sets of warp yarns. Their properties normally lie between those of woven and weft-knitted fabrics.

A particularly preferred warp-knitted fabric is tricot. In tricot fabrics the yarn typically zigzags vertically along columns of knit resulting in a series of wales (ribs) on one side (the so-called 'wales side') and on the other (back) side is the 'course side' where the courses are in series parallel to the orientation of the wales. The orientation in the present invention as such is not particularly limited.

The macroporous sheet (19b) optionally has a different surface profile on each side, e.g. rough on one side and smooth on the other, as illustrated in FIG. 3 and FIG. 4.

The permeate carrier preferably comprises two or more macroporous sheets (19b) (e.g. woven fabrics), which may be the same or different. For example, one may orientate two macroporous sheets (19b) 'back to back' with the relatively smooth faces (or 'course' sides) in contact (or separated by a gas-impermeable sheet (28) as illustrated in FIG. 5) so that the relatively rough faces (or 'wale' sides) contact the protective layers (24). As macroporous sheet(s) (19b, 19c) one may use any of the materials mentioned below as being suitable for making the porous support for the composite membrane.

The macroporous sheet (19b) is optionally made from a natural fibre or a man-made fibre, e.g. polyester, polysulfone, polyester, nylon, teflon, polypropylene, polyphenylenesulfide, etc. The fibres are optionally resin coated, e.g. with a resin such as an epoxy or melamine resin. The gaps between the fibres creates the desired porosity.

The optional gas-impermeable sheet may be any sheet which is impermeable to the gases to be separated. Examples of suitable gas-impermeable sheets include polysulfone, polyester, nylon, teflon, polypropylene, polyphenylenesulfide etc, especially polyester sheets (e.g. Mylar A50 from DuPont).

The permeate carrier preferably comprises:
(i) one or more protective sheets (24);
(ii) one or more macroporous sheets (19b, 19c) located between two or more protective sheets (24) or within the fold of one or more folded protective sheets (24), e.g. such that the two are substantially coextensive; and
(iii) optionally a gas-impermeable sheet (sometimes called an interfoil) located between the two or more macroporous sheets (19b) or within the fold of one or more folded macroporous sheet (19b), e.g. such that the two are substantially coextensive.

When the permeate carrier comprises more than two macroporous sheets (19b, 19c) it is usually necessary for the permeate carrier to comprise only one gas-impermeable sheet (28). The presence of such a gas-impermeable sheet (28) can improve selectivity, gas flux and also reduce compaction of the gas separation element arising from the high pressures experienced by the element. Suitable gas-impermeable sheets (28) preferably have a thickness of <0.1 cm, more preferably <0.07 cm.

Preferably the membrane envelope (7) is rectangular and comprises a membrane wall, two closed edges and two open edges. The feed flow of gas to be purified may enter the membrane envelope (7) through one open edge at point (26) (see the right hand side of FIG. 6) and retained feed gas may exit the membrane envelope (7) through the other open edge of membrane envelope (7) at the other point (26) (see the left hand side of FIG. 6). The open edge typically allows feed gas to enter the membrane envelope (7) freely without being filtered and without changing the composition of the feed gas. Preferably one closed edge of the membrane envelope (7) is a fold in the membrane. One may create a fold in the membrane simply by folding a membrane approximately twice the size needed in half to create a folded edge. The edge opposite to the folded edge may be closed by, for example, gluing together the membrane edges furthest away from the folded edge.

Typically the membrane envelope (7) is constructed from a composite membrane, e.g. comprising a discriminating layer and a porous support. The function of the discriminating layer is to preferentially discriminate between gases, separating a feed gas mixture into a permeate which has passed through the membrane and a retentate which has been rejected by (i.e. has not passed through) the membrane wall of the membrane envelope (7). The permeate and retentate typically comprise the same gases as the feed gas, but one is enriched in at least one of the gases present in the feed gas and the other is depleted in that same gas.

The porous support is typically open pored, relative to the discriminating layer. The porous support may be, for example, a microporous organic or inorganic membrane, or a woven or non-woven fabric or a combination thereof. The porous support may be constructed from any suitable material. Examples of such materials include polysulfones, polyethersulfones, polyimides, polyetherimides, polyamides, polyamideimides, polyacrylonitrile, polycarbonates, polyesters, polyacrylates, cellulose acetate, polyethylene, polypropylene, polyvinylidenefluoride, polytetrafluoroethylene, poly(4-methyl 1-pentene) and especially polyacrylonitrile.

One may use, for example, a commercially available, porous sheet material as the support for the composite membrane. Alternatively one may prepare the porous support using techniques generally known in the art for the preparation of microporous materials. In one embodiment one may prepare a porous, non-discriminatory support by curing curable components, then applying further curable components to the formed porous support and curing such components thereby forming the layer of cured polymer and the discriminating layer on the already macroporous sheet. One may also use a porous support which has been subjected to a corona discharge treatment, glow discharge treatment, flame treatment, ultraviolet light irradiation treatment or the like, e.g. for the purpose of improving its wettability and/or adhesiveness.

The porous support which may be used to form the membrane preferably has an average pore size of at least about 50% greater than the average pore size of the discriminating layer, more preferably at least about 100% greater, especially at least about 200% greater, particularly at least about 1000% greater than the average pore size of the discriminating layer.

The pores passing through the porous support typically have an average diameter of 0.001 to 10 µm, preferably 0.01 to 1 µm (i.e. before the porous support has been converted into a composite membrane). The pores at the surface of the porous support will typically have a diameter of 0.001 to 0.1 µm, preferably 0.005 to 0.05 µm. The pore diameter may be determined by, for example, viewing the surface of the porous support by scanning electron microscopy ("SEM") or by cutting through the support and measuring the diameter of the pores within the porous support, again by SEM. The porous support preferably has an average thickness of 20 to 500 µm, preferably 50 to 400 µm, especially 100 to 300 µm.

One may use an ultrafiltration membrane as the porous support, e.g. a polysulfone ultrafiltration membrane, cellulosic ultrafiltration membrane, polytetrafluoroethylene ultrafiltration membrane, polyvinylidenefluoride ultrafiltration membrane and especially polyacrylonitrile ultrafiltration membrane. Asymmetric ultrafiltration membranes may be used, including those comprising a porous polymer membrane (preferably of thickness 10 to 150 μm, more preferably 20 to 100 μm) and optionally a woven or non-woven fabric support. The porous support is preferably as thin as possible, provided it retains the desired structural strength.

Typically the discriminating layer is present on one side of the porous support or is partially or wholly within the porous support.

Preferred discriminating layers comprise a polyimide, especially a polyimide having —$CF_3$ groups. Polyimides comprising —$CF_3$ groups may be prepared by, for example, the general methods described in U.S. Pat. Reissue No. 30,351 (based on U.S. Pat. No. 3,899,309) U.S. Pat. Nos. 4,717,394 and 5,085,676. Typically one or more aromatic dianhydrides, preferably having —$CF_3$ groups, are condensed with one or more diamines. The diamine(s) and dianhydride(s) copolymerise to form an AB-type copolymer having alternating groups derived from the diamine(s) and dianhydride(s) respectively.

Preferably the discriminating layer comprises groups of the Formula (1) wherein Ar is an aromatic group and R is a carboxylic acid group, a sulphonic acid group, a hydroxyl group, a thiol group, an epoxy group or an oxetane group:

Formula (1)

Optionally the membranes further comprise a polymeric layer between the porous support and the discriminating layer, often referred to as a gutter layer. Preferred gutter layers comprise a dialkylsiloxane.

According to a second aspect of the present invention there is provided a gas separation module comprising:
(i) a feed carrier comprising a membrane envelope (7) and a feed spacer (19a) located within the membrane envelope (7); and
(ii) a permeate carrier comprising:
   (a) a macroporous sheet (19b); and
   (b) a protective sheet (24);
wherein:
i) protective sheet (24) shields at least a part of the membrane envelope (7) from contact with the macroporous sheet (19b); and
ii) protective sheet (24) comprises a non-woven material having a base weight of at least 35 g/m2 and/or a density of at least 0.7 g/cm3 (more preferably at least 0.9 g/cm3).

The preferences for the gas separation module according to the second aspect of the present invention and for the gas separation element according to the third aspect of the present invention are as described herein in relation to the first aspect of the present invention.

In one embodiment the permeate carrier further comprises (c) a gas impermeable sheet (28). In this embodiment the gas impermeable sheet (28) is generally located on one side of the macroporous sheet (19b) and the protective sheet (24) is located on the other side of the macroporous sheet (19b).

Preferably the gas separation module (100) is a spiral wound gas separation module. For example, the gas separation module (100) further comprises a perforated permeate collection tube (16) and the feed carrier and permeate carrier typically are wound around that tube and are in gas communication therewith.

The function of the permeate collection tube (16), when present, is to collect the permeate gas which has passed through the membrane wall of the membrane envelope (7). Thus the feed carrier and permeate carrier are typically arranged such that the permeate gas can flow through the permeate collection tube perforations (17) and the retentate gas cannot flow through the permeate collection tube perforations (17).

The perforations (17) along the length of the permeate collection tube (16) allow gas to flow from the exterior of tube to the interior. Surrounding the permeate collection tube (16) and in gas communication therewith is a permeate carrier. The permeate carrier typically transports the filtered permeate in a direction perpendicular to the axial length of the tube (16).

The permeate collection tube (16) is typically constructed of a rigid material, for example a metal (e.g. stainless steel) or a plastic.

The gas separation module is typically constructed such that gas which passes through the wall of membrane envelope (7) enters the permeate carrier (16) and gas which is rejected by the wall of the membrane envelope (7) does not enter the permeate carrier tube (16).

The feed spacer (19a) and the macroporous sheet(s) (19b, 19c) typically have a relatively large mesh size to allow gas to travel freely, e.g. axially along a membrane module (in the case of a spiral gas module). In general, the feed spacer (19a) may be formed of any material which maintains a space between adjacent walls of the membrane envelope (7) and is stable to the feed gas.

Preferred materials for the feed spacer (19a) are open, channel-forming grid materials, such as polymeric grid, or corrugated or mesh materials. Preferred among these are polypropylene or other polyolefin netting materials.

Typically the edges of the membrane envelope (7) which lie along the axial length of permeate collection tube (16) are sealed so that gas flowing through the feed spacer (19a) is prevented from direct access to permeate collection tube (16), i.e. access to the permeate collection tube (16) is only possible via permeation through the wall(s) of the membrane envelope (7). In one embodiment a membrane sheet may be folded to form the membrane envelope (7) and the feed spacer (19a) is located within the fold.

The gas separation modules may be prepared by winding the feed carrier and permeate carrier around a permeate collection tube (16) with the permeate carrier in gas communication with the permeate collection tube (16). Typically a plurality of feed carriers and permeate carriers are spiral wound about the permeate collection tube (16) such that the feed carriers and permeate carriers alternate radially from the collection tube (16) outwards.

After the membrane module has been wound, the assembly may be held in a wound state through the use of restraining bands or outer wrap(s), or a combination thereof. A preferred method of restraining the assembly is by filament winding, in which a glass fibre filament dipped in an adhesive is wound around the assembly and cured. The modules can then be loaded into a housing or pressure vessel which is preferably operated at a slight pressure drop across the module as the gas being filtered flows through. In operation, the feed gas to be filtered is introduced at one end face of the membrane module.

In a spiral wound gas separation module, the feed gas typically travels axially along the membrane module through the feed spacer (19a). As the feed gas encounters the membrane wall of the membrane envelope (7), due to a differential pressure, part of the feed gas (the permeate) passes through the membrane wall and into the permeate carrier. After the gas has passed through the wall of the membrane envelope (7), it travels along the macroporous sheet (19b), eventually passing through perforations (17) and into the permeate collection tube (16). The permeate exits the membrane module through the permeate collection tube (16) and the retentate (or concentrate) travels axially through the module along the feed spacer to exit cap (25) as illustrated in FIG. 6.

As will be appreciated, in a spiral wound gas separation module it is necessary to seal all of the open edges of the membrane envelope (7), with the exception of the edge adjacent to the permeate collection tube (16), in order to prevent the feed gas from entering the permeate carrier without first passing through the membrane wall of the membrane envelope (7). Thus it is necessary to prevent the feed gas from entering permeate carrier without first being filtered as desired.

When preparing the gas separation module according to the present invention, an adhesive may be applied to at least a part of the periphery of the membrane envelope (7), e.g. to the side edges.

Preferably the walls of the membrane envelope (7) have a C1 ($CO_2/CH_4$) selectivity ($\alpha CO_2/CH_4$)>15. Preferably the walls of the membrane envelope (7) have a C4 ($CO_2/C_4H_{10}$) selectivity ($\alpha CO_2/C_4H_{10}$) of >30, more preferably >100. Preferably the selectivity is determined by a process comprising exposing the membrane to a 13/86/1 mixture by volume of $CO_2$, $CH_4$ and $C_4H_{10}$ at a feed pressure of 6000 kPa at 40° C.

While this specification emphasises the usefulness of the gas separation elements and modules for separating gases, especially polar and non-polar gases, it will be understood that the modules and elements can also be used for other purposes.

According to a third aspect of the present invention there is provided a gas separation element comprising:
(i) a feed carrier comprising a membrane envelope (7) and a feed spacer (19a) located within the membrane envelope (7); and
(ii) a permeate carrier comprising:
 (a) a macroporous sheet (19b); and
 (b) a protective sheet (24);
wherein:
i) protective sheet (24) shields at least a part of the membrane envelope (7) from contact with the macroporous sheet (19b); and
ii) protective sheet (24) comprises a non-woven material having a density of at least 0.7 g/cm³, more preferably at least 0.9 g/cm³.

In one embodiment of the third aspect of the present invention the permeate carrier further comprises (c) a gas impermeable sheet (28). In this embodiment the gas impermeable sheet (28) is generally located on one side of the macroporous sheet (19b) and the protective sheet (24) is located on the other side of the macroporous sheet (19b).

The gas separation elements may be packaged and supplied commercially to companies who assemble gas separation modules, e.g. for personal use or onward sale. As the gas separation elements comprise a feed carrier and a permeate carrier 'back-to-back' they may easily be would onto a perforated tube to provide a gas separation module according to the present invention.

According to a fourth aspect of the present invention there is provided a gas separation module comprising one or more gas separation elements according to the third aspect of the present invention.

The preferences for the gas separation module according to the second aspect of the present invention and for the gas separation element according to the third aspect of the present invention are as described herein in relation to the first aspect of the present invention.

The gas separation elements and modules are particularly useful for the separation of a feed gas containing a target gas into a gas stream rich in the target gas and a gas stream depleted in the target gas. For example, a feed gas comprising polar and non-polar gases may be separated into a gas stream rich in polar gases and a gas stream depleted in polar gases. In many cases the membranes have a high permeability to polar gases, e.g. $CO_2$, $H_2S$, $NH_3$, $SO_x$, and nitrogen oxides, especially $NO_x$, relative to non-polar gases, e.g. alkanes, $H_2$, and $N_2$. Thus the polar gas is preferably $CO_2$, $H_2S$, $NH_3$, $SO_x$, a nitrogen oxides or two or more thereof in combination. The non-polar gas is preferably N2, H2, an alkane or two or more thereof in combination.

Preferably the polar and non-polar gases are gaseous when at 25° C.

The target gas may be, for example, a gas which has value to the user of the module or element and which the user wishes to collect. Alternatively the target gas may be an undesirable gas, e.g. a pollutant or 'greenhouse gas', which the user wishes to separate from a gas stream in order to meet product specification or to protect the environment.

The process, modules and elements are particularly useful for purifying natural gas (a mixture which predominantly comprises methane) by removing polar gases ($CO_2$, $H_2S$); for purifying synthesis gas; and for removing $CO_2$ from hydrogen and from flue gases. Flue gases typically arise from fireplaces, ovens, furnaces, boilers, combustion engines and power plants. The composition of flue gases depend on what is being burned, but usually they contain mostly nitrogen (typically more than two-thirds) derived from air, carbon dioxide ($CO_2$) derived from combustion. Flue gases also contain a small percentage of pollutants such as particulate matter, carbon monoxide, nitrogen oxides and sulphur oxides. Recently the separation and capture of $CO_2$ has attracted attention in relation to environmental issues (global warming).

The process, modules and elements of the present invention are particularly useful for separating the following: a feed gas comprising $CO_2$ and $N_2$ into a gas stream richer in $CO_2$ than the feed gas and a gas stream poorer in $CO_2$ than the feed gas; a feed gas comprising $CO_2$ and $CH_4$ into a gas stream richer in $CO_2$ than the feed gas and a gas stream poorer in $CO_2$ than the feed gas; a feed gas comprising $CO_2$ and $H_2$ into a gas stream richer in $CO_2$ than the feed gas and a gas stream poorer in $CO_2$ than the feed gas, a feed gas comprising $H_2S$ and $CH_4$ into a gas stream richer in $H_2S$ than the feed gas and a gas stream poorer in $H_2S$ than the feed gas; and a feed gas comprising $H_2S$ and $H_2$ into a gas stream richer in $H_2S$ than the feed gas and a gas stream poorer in $H_2S$ than the feed gas.

The process, modules and elements of the present invention are particularly useful for separating 'dirty' a feed gas comprising a polar gas, a non-polar gas and a hydrocarbon containing at least two (e.g. 2 to 7) carbon atoms into a permeate gas and a retentate gas, one of which is enriched in the polar gas and the other of which is depleted in the polar gas.

The invention will now be illustrated by the following, non-limiting examples.

EXAMPLES

In these Examples the performance of gas separation modules was evaluated using (a) gas separation modules as described in part (A) below and (b) using simplified gas separation composites comprising only a membrane sheet, a protective sheet and macroporous sheet, as described in part (B) below.

In the Examples, the feed gas had the composition shown in Table 1 below:

TABLE 1

| Feed gas | Components | | |
|---|---|---|---|
| | $CO_2$ | $CH_4$ | n-$C_4H_{10}$ |
| vol % | 13.00 | 86.00 | 1.00 |

The gas selectivity, viscosity and imprint performance were measured using the simplified system described above by the following techniques:

(A) Gas Flux

Gas Separation Module:

The feed gas having the composition described in Table 1 above was passed through the gas separation module under test at 30° C. at a gas feed pressure of 3000 kPa. The flux of $CO_2$, and $C_4H_{10}$ through the gas separation module was measured using a gas separation module with 22 gas separation elements with an element size of approximately 900 mm×900 mm.

Simplified Gas Separation Composite:

The feed gas having the composition described in Table 1 above was passed through the simplified gas separation composite under test at 40° C. at a gas feed pressure of 6000 kPa. The flux of $CO_2$ and $C_4H_{10}$ through the simplified gas separation composites was measured using a gas permeation cell with a measurement diameter of 3.0 cm.

The flux ($Q_i$) of $CO_2$ and $C_4H_{10}$ was determined after a period of 10 minutes (module) and 5 minutes (simplified gas separation composites) continuous use using the following equation:

$$Q_i = (\theta_{Perm} \cdot X_{Perm,i})/(A \cdot (P_{Feed} \cdot X_{Feed,i} - P_{Perm} \cdot X_{Perm,i}))$$

wherein:

$Q_i$=Flux of the relevant gas (i.e. i is $CO_2$ or $C_4H_{10}$) ($m^3$(STP)/$m^2 \cdot kPa \cdot s$);

$\theta_{Perm}$=Permeate flow rate ($m^3$(STP)/s);

$X_{perm,i}$=Volume fraction of the relevant gas in the permeate gas;

A=Membrane area ($m^2$);

$P_{Feed}$=Feed gas pressure (kPa);

$X_{Feed,i}$=Volume fraction of the relevant gas in the feed gas;

$P_{Perm}$=Permeate gas pressure (kPa); and

STP is standard temperature and pressure, which is defined here as 25.0° C. and 1 atmosphere pressure (101.325 kPa).

(B) Selectivity

The selectivity ($CO_2$/$C_4H_{10}$ selectivity; $\alpha CO_2/_{C_4H_{10}}$) of each gas separation element under test for the gas mixture described in Table 1 was calculated from $QCO_2$ and $QC_4H_{10}$ calculated as described in (A) above based on following equations:

$$\alpha CO_2/C_4H_{10} = QCO_2/QC_4H_{10}$$

wherein $QCO_2$, $QCH_4$ and $QC_4H_{10}$ were determined by the method described in step (A) above.

An $\alpha CO_2/C_4H_{10}$ value of 30 or higher was deemed to be acceptable and an $\alpha CO_2/C_4H_{10}$ value of below 30 was deemed to be unacceptable.

(C) Evaluation of Viscosity

Viscosity was measured using a Brookfield LVDV-II+ PCP viscosity meter, using either spindle CPE-40 or CPE-52 depending on viscosity range.

(D) Imprint Performance

Imprint Performance was determined as follows:

A membrane sheet, protective sheet and macroporous sheet were placed together in the order shown in Table 2 below to give a stack of sheets. Each sheet was circular and had a diameter of 48 mm:

TABLE 2

Membrane sheet
Protective sheet
Macroporous sheet

In the Comparative Examples, the protective layer was either omitted or was included. The stack of sheets was placed into a cell and a gas mixture comprising $O_2$ and $N_2$ was applied to the membrane side at a pressure of 100 bar for 30 minutes at 60° C. The pressure was then reduced to atmospheric pressure and the membrane was removed from the set of layers. The imprint performance, i.e. the extent to which the macroporous sheet had imprinted its texture onto the membrane sheet, was then evaluated by visual inspection or dyeing as follows:

Visual Imprint Performance:

The membrane which had been subjected to high pressures as described above in this part (D) was inspected visually and the extent to which the macroporous sheet had imprinted its texture onto the membrane was scored as follows:

X=the pattern of the macroporous sheet was clearly imprinted onto the membrane.

X~Δ=the pattern of the macroporous sheet was just about recognizable on the membrane.

Δ=the pattern of the macroporous sheet was visible on the membrane but not clearly defined.

Δ~O=the pattern of the macroporous sheet was visible only if the membrane was inspected closely.

O=the pattern of the macroporous sheet was not visible on the membrane).

Dyeing Imprint Performance:

After the stack of sheets had been subjected to high pressures as described above in this part (D), six drops of a blue dye solution (a 1 wt % solution of 1,4-bis[(2-ethylhexyl)amino]-anthraquinone in n-heptane) were applied at room temperature for 30 seconds to the entire surface of the membrane side facing the protective sheet/macroporous sheet. Then excess dye solution was removed from the membrane and the surface of the membrane was washed with n-heptane. Any damaged area of the membrane were visible as blue dots/spots or scratches/lines. Each membrane was scored qualitatively as follows according to how many (if any) blue dots/spots or lines/scratches were visible to the naked eye after the washing with n-heptane:

XXX=many blue lines/scratches (>10) were observed
XX=6 to 9 blue lines/scratches were observed
X=1 to 5 blue lines/scratches were observed
X~Δ=many blue dots/spots (>10) were observed
Δ=6 to 9 blue dots/spots were observed
Δ~O=1 to 5 blue dots/spots were observed
O=no blue spots were observed Gas Separation Elements The following materials were used to prepare the gas separation elements:

PAN is a porous support polyacrylonitrile L10 ultrafiltration membrane from GMT Membrantechnik GmbH, Germany X-22-162C is a dual end reactive silicone having carboxylic acid reactive groups, a viscosity of 220 mm²/s and a reactive group equivalent weight of 2,300 g/mol, from Shin-Etsu Chemical Co., Ltd. (MWT 4,600).

X-22-162c

DBU is 1,8-diazabicyclo[5.4.0]undec-7-ene from Sigma Aldrich.

UV-9300 is SilForce™ UV-9300 from Momentive Performance Materials Holdings having an epoxy equivalent weight of 950 g/mole oxirane (MWT 9,000, determined by viscometry).

CAS: 67762-95-2

UV-9300

I0591 is 4-isopropyl-4'-methyldiphenyliodoniumtetrakis (pentafluorophenyl) borate ($C_{40}H_{18}BF_{20}I$) from Tokyo Chemical Industries N.V. (Belgium)

Ti(OiPr)$_4$ is titanium (IV) isopropoxide from Dorf Ketal Chemicals (MWT 284).

n-Heptane is n-heptane from Brenntag Nederland BV.

MEK is 2-butanone from Brenntag Nederland BV.

MIBK is 4-methylpentan-2-one from Brenntag Nederland BV.

DIOX is 1,3-dioxolane from Brenntagg Nederland BV.

APTMS is 3-trimethoxysilyl propan-1-amine from Sigma Aldrich.

PI is 6FDA-DATMBX m/DABA n, m/n=90/10 wherein X is —SO$_2$NH$_2$; obtained from FUJIFILM Corporation, having the following structure:

PE Interfoil is a 50 μm thick gas-Impermeable polyester sheet sold under the name Mylar A50, obtained from Dupont.

The macroporous sheets used in the Examples were as shown in Table 3, none of which are anisotropic, wherein "wpi" means wales per 2.54 cm and "cpi" means courses per 2.54 cm:

TABLE 3

| Macroporous Sheet | Supplier | Description | Average thickness (mm) | wpi | cpi |
|---|---|---|---|---|---|
| H2503 | Hornwood Inc. | A fabric made from polyethylene terephthalate and epoxy resin. | 0.3 | 46 | 44 |
| G36168 | Guilford performance textiles | A fabric made from polyethylene terephthalate and epoxy resin | 0.3 | 48 | 46 |
| G42369 | Guilford performance textiles | A fabric made from polyethylene terephthalate and epoxy resin. | 0.3 | 60 | 59 |

The protective sheets used in the Examples are as shown in Table 4, all of which are anisotropic:

TABLE 4

| Protective sheet | Supplier | Description | Average thickness (μm) | Average weight (g/m2) | Average density (g/cm3) |
|---|---|---|---|---|---|
| 05TH100 | Hirose paper manufacturing | Type TH, a wet-laid polyester non woven | 160 | 100 | 0.63 |
| 05TH100S | Hirose paper manufacturing | Type TH, a wet-laid polyester non woven | 110 | 100 | 0.93 |
| 05TH20H | Hirose paper manufacturing | Type TH, a wet-laid polyester non woven | 45 | 20 | 0.44 |
| 05TH40H | Hirose paper manufacturing | Type TH, a wet-laid polyester non woven | 70 | 40 | 0.55 |
| 315TH80S | Hirose paper manufacturing | Type TH, a wet-laid polyester non woven | 90 | 80 | 0.91 |
| 315TH100S | Hirose paper manufacturing | Type TH, a wet-laid polyester non woven | 125 | 100 | 0.8 |

Preparation of Membrane Sheet

Stage a) Preparation of a Partially Cured Polymer ("PCP Polymer")

The components UV-9300, X-22-162C and DBU were dissolved in n-heptane in the amounts indicated in Table 5 and maintained at a temperature of 91° C. for 168 hours. The resultant polymer (PCP Polymer), had a Si content (meq/g polymer) of 12.2 and the resultant solution of PCP Polymer had a viscosity of 125 mPas at 25.0° C.

TABLE 5

| Ingredients used to Prepare PCP Polymer | |
|---|---|
| Ingredient | Amount (w/w %) |
| UV-9300 (w/w %) | 46.395 |
| X-22-162C (w/w %) | 13.596 |
| DBU (w/w %) | 0.009 |
| n-Heptane (w/w %) | 40.000 |

Stage b) Preparation of Radiation Curable Composition ("C")

The solution of PCP Polymer arising from the Stage a) was cooled to 20° C. and diluted using n-heptane to give the PCP Polymer concentration indicated in Table 6 below. The solution was then filtered through a filter paper having a pore size of 2.7 μm. The photoinitiator (I0591) and a metal complex (Ti(OiPr)$_4$) were then added in the amounts (wt/wt %) indicated in Table 6 to give Curable Composition C. The amount of Ti(OiPr)$_4$ present in Curable Composition C corresponded to 55.4 μmol of Ti(OiPr)$_4$ per gram of PCP Polymer. Also the molar ratio of metal:silicon in Curable Composition C was 0.0065.

TABLE 6

| Preparation of Curable Composition C | |
|---|---|
| Ingredient | Amount (wt/wt %) |
| PCP Polymer | 10.000 |
| I0591 | 0.105 |
| Ti(OiPr)$_4$ | 0.226 |
| DBU | 0.001 |
| MEK | 2.008 |
| n-Heptane | 87.660 |
| Viscosity (mPas at 25° C.) | 1.72 |

Stage c)—Preparing a Membrane Comprising a Porous Support, a Gutter Layer, a Discriminating Layer and a Protective Layer ("Membrane 1").

Curable Composition C was used to prepare the gutter layer and the protective layer of a membrane, as described in more detail below.

Step i. Formation of Porous Support Comprising a Gutter Layer

Curable Composition C was applied to a porous support (comprising PAN) by a meniscus dip coating at a speed of 10 m/min and the coated support was then irradiated at an intensity of 16.8 kW/m (70%) using a Light Hammer LH10 from Fusion UV Systems fitted with a D-bulb. The resultant sheet material comprised the porous support and a gutter layer having a dry thickness of 600 nm. The gutter layer comprised a metal complex and dialkylsiloxane groups. The gutter layer thickness was verified by cutting through the sheet material and measuring the thickness from the surface of the porous support outwards by SEM.

Step ii. Formation of a Membrane Comprising a Porous Support, a Gutter Layer and a Discriminating Layer The composition described in Table 7 below was applied to the sheet material (support+gutter layer) resulting from step i. using a meniscus-type coating at 10 m/min coating speed. The average thicknesses of the discriminating layer was 90 nm, as measured by SEM.

TABLE 7

| Ingredient | Amount (wt/wt %) |
|---|---|
| PI | 1.00 |
| APTMS | 0.005 |

TABLE 7-continued

| Ingredient | Amount (wt/wt %) |
|---|---|
| MIBK | 3.00 |
| DIOX | 4.995 |
| MEK | 91.00 |

Step iii. Formation of a Membrane Comprising a Porous Support, a Gutter Layer, a Discriminating Layer and a Protective Layer A membrane with a protective layer was prepared as follows:

Curable composition C having the formulation described above was applied to the membrane arising from step ii. above by a meniscus dip coating at a speed of 10 m/min. The coated membrane was then cured by irradiating at an intensity of 24 kW/m using a Light Hammer LH10 from Fusion UV Systems fitted with a D-bulb. The resultant membrane ("Membrane 1") comprised the porous support, a gutter layer, a discriminating layer and a protective layer. The average thicknesses of the protective layer was 1200 nm, as measured by SEM.

Stage D)—Preparation of Gas Separation Elements
Stage D1)—Preparation of Feed Carrier 1 ("FC1")

Feed carrier FC1 was prepared by folding a membrane sheet around the macroporous sheet. In this configuration, the gutter layer, selective layer and protective layer were on the inner side of the envelope, facing the macroporous sheet. This gave a feed carrier having the general structure shown in Table 8 below, as illustrated in the upper part of FIG. 5:

TABLE 8

| Feed Carrier FC1 |
|---|
| Membrane sheet |
| Macroporous sheet |
| Membrane sheet |

Stage D2)—Preparation of Permeate Carriers PC1 to PC7 and Comparative Permeate Carriers 1 CPC1 to CPC8

The general method for preparing the permeate carriers was as follows:

Three side edges of two rectangular macroporous sheets (19b, 19c) were glued with a gas-tight seal on either side of a gas-impermeable sheet (28) Mylar A50 sheet using a 2 to 1 mix of Araldite GY250ES adhesive (produced by Huntsman) and Uradir140BD (also produced by Huntsman). Then three side edges of two rectangular protective sheets (24, 24) were glued with same glue mixture mentioned above to give a gas-tight seal on each side of the macroporous sheets (19b, 19c) to give a permeate carrier having the general structure shown in Table 9 below with the open edges all on the same side, as illustrated in the lower part of FIG. 5:

TABLE 9

| Permeate Carriers |
|---|
| Protective sheet |
| Macroporous sheet |
| Gas-impermeable sheet |
| Macroporous sheet |
| Protective sheet |

Stage D3)—Preparation of Gas Separation Elements

The rectangular feed carrier FC1 prepared in Stage D1) was laid on top of the rectangular permeate carrier prepared in Stage D2). Then three side edges of the feed carrier and permeate carrier were glued together. As the gas separation layer in the feed carrier is impermeable for the glue, the channel inside the feed spacer, parallel to the permeate collection tube (16) remains open. In this way a gas separation element is created having an opening for feed gas to enter the gas separation element at the side perpendicular to the opening for permeate to exit the gas separation element towards the permeate collection tube (16).

The overall structure of the gas separation element is illustrated schematically below in Table 10:

TABLE 10

| Gas Separation Elements | |
|---|---|
| Membrane sheet | Feed carrier |
| Macroporous sheet | |
| Membrane sheet | |
| Protective sheet | Permeate carrier |
| Macroporous sheet | |
| Gas-impermeable sheet | |
| Macroporous sheet | |
| Protective sheet | |

In this way, a set of 22 gas separation elements with an approximate size of 900 mm×900 mm is wound around a permeate collection tube (16) to form a gas separation module.

COMPARATIVE EXAMPLE(S)

Comparative gas separation elements were prepared essentially as described above for the gas separation elements of the invention, except that the layers were as described in Table 11 below in which:
F is the feed carrier FC1 prepared as described above;
MS is the macroporous sheet;
I is the gas-impermeable sheet; and
P is the protective sheet.

TABLE 11

| Gas Separation Elements ("GSE") | | | | | |
|---|---|---|---|---|---|
| Example | GSE Structures | Identity of Protective Sheet (P) | Density of P (g/cm3) | Macroporous sheet identity (MS) | MS orientation (i.e. which side faces the membrane) |
| CEx1 | F/MS/I/MS/F | -- | -- | H2503 | Course |
| Ex1 | F/P/MS/I/MS/P/F | 05TH100S | 1.0 | G42369 | Wale |
| CEx2 | F/MS/I/MS/F | -- | -- | G42369 | Course |
| CEx3 | F/MS/I/MS/V | -- | -- | G36168 | Course |
| CEx4 | F/MS/I/MS/F | -- | -- | G36168 | Wale |
| Ex2 | F/P/MS/I/MS/P/F | 05TH100S | 1.0 | H2503 | Wale |

TABLE 11-continued

| | | Gas Separation Elements ("GSE") | | | |
|---|---|---|---|---|---|
| Example | GSE Structures | Identity of Protective Sheet (P) | Density of P (g/cm3) | Macroporous sheet identity (MS) | MS orientation (i.e. which side faces the membrane) |
| Ex3 | F/P/MS/I/MS/P/F | 05TH100S | 1.0 | H2503 | Course |
| Ex4 | F/P/MS/I/MS/P/F | 05TH100S | 1.0 | G36168 | Course |
| Ex5 | F/P/MS/I/MS/P/F | 05TH100S | 1.0 | G36168 | Wale |
| Ex6 | F/P/MS/I/MS/P/F | 05TH100 | 0.63 | G42369 | Wale |
| Ex7 | F/P/MS/I/MS/P/F | 05TH100 | 0.63 | G36168 | Course |
| Ex8 | F/P/MS/I/MS/P/F | 05TH100 | 0.63 | H2503 | Wale |
| Ex9 | F/P/MS/I/MS/P/F | 05TH100 | 0.63 | H2503 | Course |
| Ex10 | F/P/MS/I/MS/P/F | 315TH80S | 0.91 | G36168 | Course |
| Ex11 | F/P/MS/I/MS/P/F | 315TH100S | 0.8 | G36168 | Course |
| CEx5 | F/P/MS/I/MS/P/F | 05TH20H | 0.44 | G36168 | Course |
| Ex12 | F/P/MS/I/MS/P/F | 05TH40H | 0.55 | G36168 | Course |
| CEx6 | F/P/MS/I/MS/P/F | G36168 | 0.47 | G36168 | Course |

F = Feed carrier FC1
P = Protective sheet
MS = Macroporous sheet
I = Impermeable sheet (PE Interfoil as described above)
-- means not measured or not present.
--- note that in CEx6 the protective sheet (P) is a woven material Results The visual imprint performance, dyeing imprint performance and selectivity of the resultant gas separation elements were measured by the methods described above and the results are also shown in Table 12 below:

TABLE 12

| | | Imprint Performance and selectivity | | | | |
|---|---|---|---|---|---|---|
| Sample | Protective sheet (P) | Macroporous sheet (MS) | MS orientation (i.e. facing membrane) | Visual Imprint Performance | Dyeing Imprint Performance | Selectivity |
| CEx1 | -- | H2503 | Course | X | XXX | 7.5 |
| Ex1 | 05TH100S | G42369 | Wale | ○ | ○ | 342.1 |
| CEx2 | -- | G42369 | Course | X | XXX | 13.5 |
| CEx3 | -- | G36168 | Course | X | XXX | 9.9 |
| CEx4 | -- | G36168 | Wale | -- | XXX | 18.9 |
| Ex2 | 05TH100S | H2503 | Wale | -- | Δ~○ | -- |
| Ex3 | 05TH100S | H2503 | Course | -- | Δ~○ | -- |
| Ex4 | 05TH100S | G36168 | Course | Δ | Δ~○ | 136.2 |
| Ex5 | 05TH100S | G36168 | Wale | -- | Δ~○ | -- |
| Ex6 | 05TH100 | G42369 | Wale | -- | Δ | -- |
| Ex7 | 05TH100 | G36168 | Course | Δ | Δ | 78.6 |
| Ex8 | 05TH100 | H2503 | Wale | -- | Δ | -- |
| Ex9 | 05TH100 | H2503 | Course | -- | Δ | -- |
| Ex10 | 315TH80S | G36168 | Course | Δ~○ | Δ~○ | 81.2 |
| Ex11 | 315TH100S | G36168 | Course | Δ~○ | Δ~○ | 82.3 |
| CEx5 | 05TH20H | G36168 | Course | X | L | 25 |
| Ex12 | 05TH40H | G36168 | Course | Δ | Δ | 49 |
| CEx6 | G36168 | G36168 | Course | X | XXX | 8.7 |

-- means not measured.
--- note that in CEx6 the protective sheet is woven material Preparation of Modules The gas separation elements described in Table 11 were wound onto a perforated tube of diameter 5 cm (a permeate collection tube). The feed spacers present in each feed carrier were present in order to allow the influx of feed gas to the side of the membrane within the membrane envelope. The non-glued edge of each permeate carrier was fixed to a gas-permeable sheet made of the same material as the permeate carrier material. The gas-permeable sheet was then fixed to the permeate collection tube where it acted as a support for multiple, individual permeate carriers such that gas which permeates through the membrane walls of the feed carriers can then flow through the permeate carrier and into the permeate collection tube but gas which does not permeate through the membrane walls of the feed carriers cannot enter the permeate collection tube. The resultant structure was encased in fibreglass and anti-telescoping devices were glued to each corner cylinder side to give gas separation modules. The modules were then cased in a steel housing and tested for gas flux and selectivity by the above described methods. The properties of the resultant modules are shown in Table 13 below.

After exposing the gas separation modules described in Table 13 to 9000 kPa, 30° C. for 10 min by air purge, the selectivity of the modules described in Table 13 below was determined by the method described in Section (A) and (B) above.

The Imprint performance of the modules was determined using the method described above in Section (D) above and the average result from 10 samples is provide din Table 13:

TABLE 13

Gas Separation Modules containing the GSEs

| | GSE | Protective sheet | Selectivity | Visual Imprint performance | Dyeing Imprint Performance |
|---|---|---|---|---|---|
| Module 1 | Ex1 | 05TH100S | 265 | ○ | ○ |
| Module 2 | CEx1 | — | 16 | X | XXX |
| Module 3 | CEx2 | G36168 | 13 | X | XXX |

The invention claimed is:

1. A process for separating a feed gas comprising a polar gas and a non-polar gas into a permeate gas and a retentate gas, one of which is enriched in the polar gas and the other of which is depleted in the polar gas, the process comprising passing the feed gas through a gas separation module comprising:
   (i) a feed carrier comprising a membrane envelope and a feed spacer located within the membrane envelope; and
   (ii) a permeate carrier comprising:
      (a) a macroporous sheet; and
      (b) a protective sheet; and
   wherein:
   i) the feed gas is fed along the feed spacer of the feed carrier and a part of the feed gas passes through the membrane envelope and into the permeate carrier to give the permeate gas and a part of the feed gas is rejected by the membrane envelope to give the retentate gas;
   ii) the protective sheet shields at least a part of the membrane envelope from contact with the macroporous sheet;
   iii) the protective sheet comprises a non-woven material, and
   iv) the macroporous sheet has a wale side orientation facing the membrane envelope.

2. The process according to claim 1 wherein the protective sheet has a weight of at least 35 g/m2.

3. The process according to claim 1 wherein the protective sheet has a weight of 60 to 120 g/m2.

4. The process according to claim 1 wherein the protective sheet has a density of at least 0.7 g/cm3.

5. The process according to claim 1 wherein the permeate carrier comprises an impermeable sheet.

6. The process according to claim 5 wherein the permeate carrier comprises two macroporous sheets.

7. The process according to claim 5 wherein the impermeable sheet is located in the permeate carrier between two macroporous sheets.

8. A gas separation element comprising:
   (i) a feed carrier comprising a membrane envelope and a feed spacer located within the membrane envelope; and
   (ii) a permeate carrier comprising:
   (a) a macroporous sheet having a wale side orientation facing the membrane envelope; and
   (b) a protective sheet;
   wherein:
   i) the protective sheet shields at least a part of the membrane envelope from contact with the macroporous sheet; and
   ii) the protective sheet comprises a non-woven material having a weight of at least 35 g/m$^2$ and/or a density of at least 0.7 g/cm3.

9. The gas separation element according claim 8 wherein the protective sheet has a weight of at least 35 g/m2.

10. The gas separation element according claim 8 wherein the protective sheet has a density of at least 0.7 g/cm3.

11. The gas separation element according to claim 8 wherein the protective sheet has a weight of at least 50 g/m2.

12. The gas separation element according to claim 8 wherein the protective sheet has a density of at least 0.9 g/cm3.

13. The gas separation module comprising one or more gas separation elements according to claim 8.

14. The gas separation module according to claim 13 comprising a stack of the gas separation elements constructed such that the feed carrier and the permeate carrier are arranged in alternating order.

15. The gas separation module according to claim 13 which is a spiral wound gas separation module.

16. The process according to claim 1 wherein the protective sheet has a weight of at least 35 g/m2 and a density of at least 0.7 g/cm3.

17. The process according to claim 1 wherein the protective sheet has a weight of 60 to 120 g/m2 and a density of at least 0.9 g/cm3.

18. The gas separation element according to claim 8 wherein the protective sheet has a weight of 60 to 120 g/m2 and a density of at least 0.9 g/cm3.

19. The process according to claim 1 wherein
the permeate carrier comprises
   (a) one or more macroporous sheets; and
   (b) one or more protective sheets; and wherein
each macroporous sheet has a wale side orientation facing an adjacent membrane envelope.

20. The process according to claim 1 wherein
the permeate carrier comprises
   (a) two macroporous sheets; and
   (b) two protective sheets; and wherein
each macroporous sheet has a wale side orientation facing an adjacent membrane envelope.

* * * * *